(12) United States Patent
Rossetto et al.

(10) Patent No.: US 7,576,299 B2
(45) Date of Patent: Aug. 18, 2009

(54) GENERATOR FOR ARC WELDER WITH HIGH POWER FACTOR

(75) Inventors: Gianni Rossetto, Albignasego (IT); Daniele Taccon, Vicenza (IT); Franco Mela, Piazzola Sul Brenta (IT)

(73) Assignee: Selco S.r.l., Tombolo, Frazione Onara (IT)

( * ) Notice: Subject to any disclaimer, the term of this patent is extended or adjusted under 35 U.S.C. 154(b) by 344 days.

(21) Appl. No.: 10/544,543

(22) PCT Filed: Feb. 6, 2004

(86) PCT No.: PCT/EP2004/001102

§ 371 (c)(1),
(2), (4) Date: May 17, 2006

(87) PCT Pub. No.: WO2004/071703

PCT Pub. Date: Aug. 26, 2004

(65) Prior Publication Data

US 2006/0237408 A1    Oct. 26, 2006

(30) Foreign Application Priority Data

Feb. 14, 2003    (IT) .......................... PD2003A0027

(51) Int. Cl.
*B23K 9/10* (2006.01)

(52) U.S. Cl. .................. 219/130.21; 219/130.1; 219/137 PS; 219/130.51

(58) Field of Classification Search .............. 219/130.1, 219/137 PS
See application file for complete search history.

(56) References Cited

U.S. PATENT DOCUMENTS

| 5,406,051 A | 4/1995 | Lai |
| 6,177,645 B1 * | 1/2001 | Church et al. .................. 363/89 |
| 6,570,128 B1 | 5/2003 | Mela |
| 2001/0042739 A1 * | 11/2001 | Mela ....................... 219/130.1 |

FOREIGN PATENT DOCUMENTS

EP    0 602 495 A    6/1994

* cited by examiner

*Primary Examiner*—Tu B Hoang
*Assistant Examiner*—Stephen J Ralis
(74) *Attorney, Agent, or Firm*—Modiano & Associati; Albert Josif; Daniel J. O'Byrne

(57) ABSTRACT

A generator for arc welder, of the type composed of a rectifier stage followed by a PFC stage and by an inverter stage, both of the high-frequency type, the latter stage supplying power to a final rectifier stage for a welding arc, the PFC stage being composed of two inductors that are mutually magnetically coupled, two diodes with opposite conduction directions, two leveling capacitors and means for controlling the succession of the on and off switchings of the two first switches, so as to shape the current absorbed by the rectifier stage by correlating it to the waveform of the line voltage. The inverter stage comprises four triads of second controlled switches, diodes and capacitors, and there is also a control device for the four second switches and for the current for the final stage that supplies power to the welding arc.

7 Claims, 5 Drawing Sheets

GENERATOR FOR ARC WELDER WITH HIGH POWER FACTOR

TECHNICAL FIELD

The present invention relates to a generator to be used in an electric arc welder; more particularly, the present invention relates to a generator that converts an alternating single- or three-phase mains current into a direct current that is controlled and adapted for the welding arc.

BACKGROUND ART

The problems that arise in generators for arc welders are linked mainly to the low power factor of the current absorbed from the power supply mains.

Additionally, another factor that has a negative effect on the efficiency of an arc welder provided according to known layouts and methods is the unpredictable variation of the power supply voltage.

With reference to the background art by way of example, the classic widely used layout of an electronic welder is shown in FIG. 1.

The layout comprises, on the mains side, a first rectifier stage 1 constituted only by diodes, followed by a bank of leveling capacitors 2.

The current thus rectified and leveled supplies an inverter block 3 provided by means of high-frequency electronic switches, which supplies the primary winding of a transformer 4.

The secondary winding of the transformer 4 is followed by a second rectifier stage 5.

The current in output from the second rectifier stage 5 is leveled by an inductor 6 and supplies a welding arc 7.

A generator of this kind, during operation, absorbs from the mains a current that has a behavior of the type shown in FIG. 2.

It is immediately evident that a waveform of this type has a high harmonic content, and this entails a low power factor.

In this situation, in order to have a high useful power level in the arc it is necessary to absorb a high RMS value from the mains.

This entails a considerable negative impact on the power supply network, since the high harmonic content and the high RMS value of the absorbed current cause an increase in the heating of the power supply conductors and a considerable distortion of the waveform of the voltage of the power supply line, which in turn causes an increase in losses in the ferromagnetic cores of the transformers connected thereto.

Additionally, the distortion of the waveform introduces considerable noise on the line.

Further, when the welding generators are of limited power, as occurs for those intended to be supplied by domestic utility systems, the high intensity of the absorbed RMS current causes the intervention of the thermal protection of the utility system even though the power delivered on the welding arc is lower than that of an equivalent resistive load.

Moreover, as already mentioned, a generator with a layout of the type shown in FIG. 1 inevitably is affected by the variations in the input supply voltage, and this reduces considerably the performance of said generator.

In view of these problems, welding generators have been devised that have additional stages that allow a mains current absorption that is as sinusoidal as possible, i.e., render the generator equivalent to a resistive load so as to be able to use all the active power available to the user.

Additional stages have also been adopted which have the task of automatically adapting the generator to the mains voltage variations, ensuring good and stable performance of the generator.

Generators with layouts of this type can be of the type shown schematically in FIG. 3.

This layout clearly shows that with respect to the diagram of FIG. 1 there is the addition of a stage 8 that is interposed between the rectifier block 1 and the leveling block 2.

This stage, termed PFC, can be provided in various kinds.

Generators of this type are in any case expensive and complicated and sometimes critical in the choice of the components that need to withstand high voltages.

DISCLOSURE OF THE INVENTION

The aim of the present invention is to provide an arc welding generator that absorbs from the mains a current with a high power factor.

Within this aim, an object of the invention is to provide an arc welding generator that is not sensitive to variations of the power supply voltage drawn from the mains.

Another object is to provide a set of circuits in which it is possible to use components that have a low cost and high efficiency.

This aim and these and other objects that will become better apparent hereinafter are achieved by a generator for arc welder of the type composed of a rectifier stage supplied by the mains, followed by a PFC stage and by an inverter stage, both of the high-frequency type, the latter supplying an output stage for supplying power to a welding arc, characterized in that:

said PFC stage is composed of: two inductors, which are mutually magnetically coupled and are arranged in series at the output of the rectifier stage; two first high-frequency controlled switches, which are connected between a common node and two nodes respectively at the outputs of the two inductors; two diodes with opposite conduction directions, which are respectively connected to the nodes between the switches and mutual inductors; two leveling capacitors, which are connected to the output nodes of said diodes and the common of said first switches; means being further provided for controlling the succession of the on and off switchings of said two first switches, so as to shape the current absorbed by the rectifier stage, correlating it to the waveform of the line voltage;

said inverter stage, supplied between the common of said first high-frequency switches and the common node between said capacitors, comprises four triads, each composed of a second controlled switch, a diode and a capacitor, connected so as to form five nodes, respectively a central node, two intermediate nodes and two external nodes, said external nodes being connected to the nodes between said first switches and the respective diodes, said intermediate nodes being connected to the common of said two first electronic switches with the interposition of a diode respectively, a capacitor being connected between said intermediate nodes, a control device being further provided for the four second switches, the current for the output stage that supplies the welding arc being drawn between the common of the two first switches and the central node of said four triads of second controlled switches, diodes and capacitors.

BRIEF DESCRIPTION OF THE DRAWINGS

Further characteristics and advantages of the invention will become better apparent from the following detailed description of a preferred embodiment thereof, illustrated by way of non-limiting example in the accompanying drawings, wherein.

WAYS OF CARRYING OUT THE INVENTION

Figure 1:
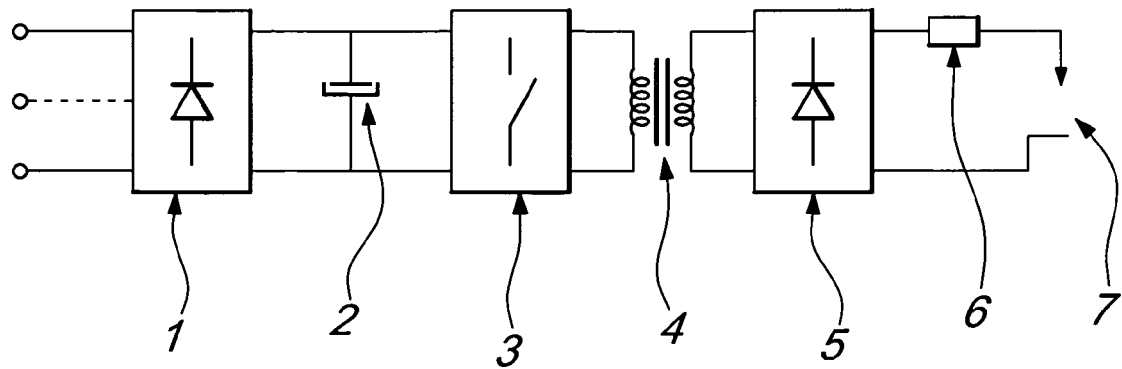
FIGS. 1, 2, 3 and 4 are views of known devices and of operating diagrams thereof.
Figure 2:
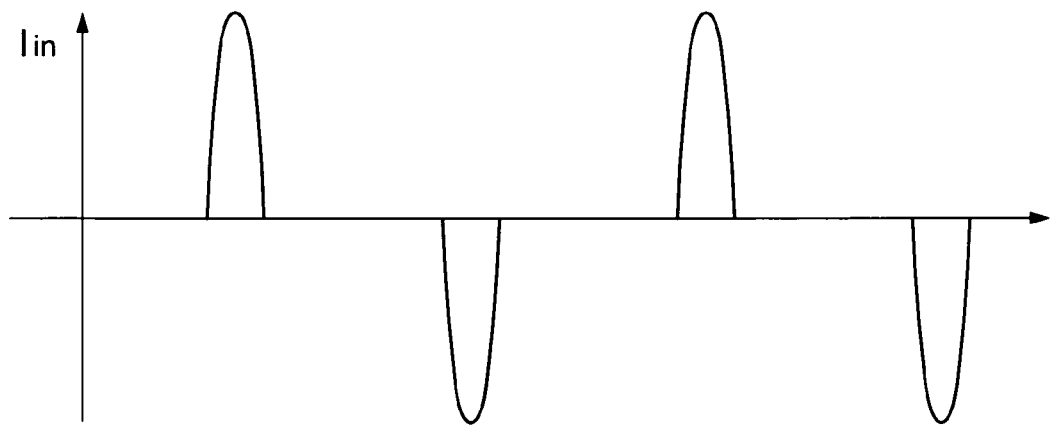
Figure 3:
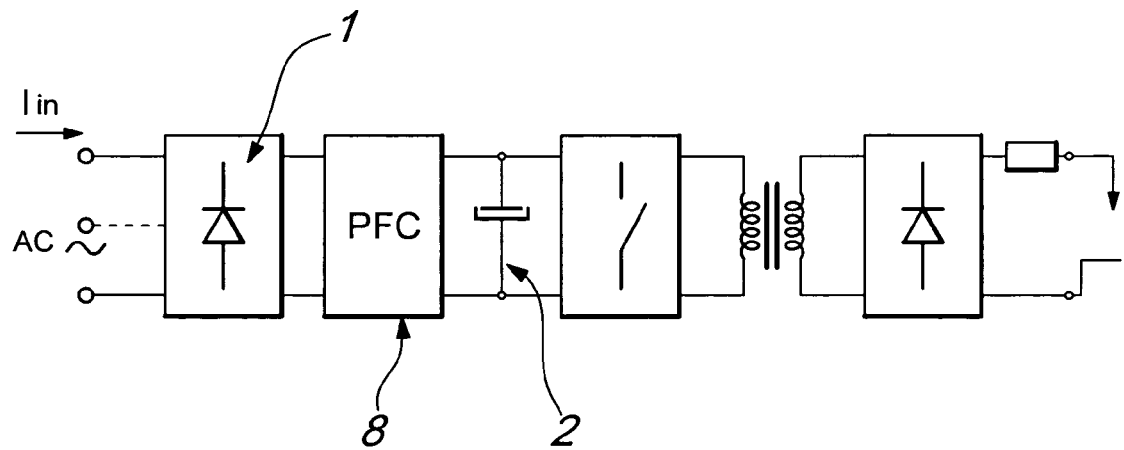
Figure 4:
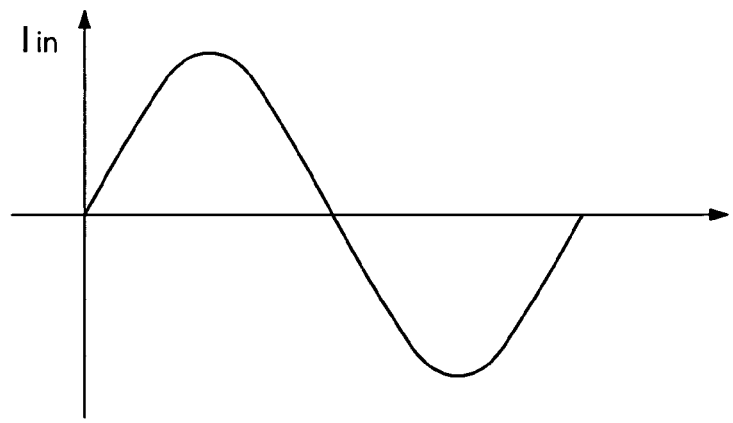
Figure 5:
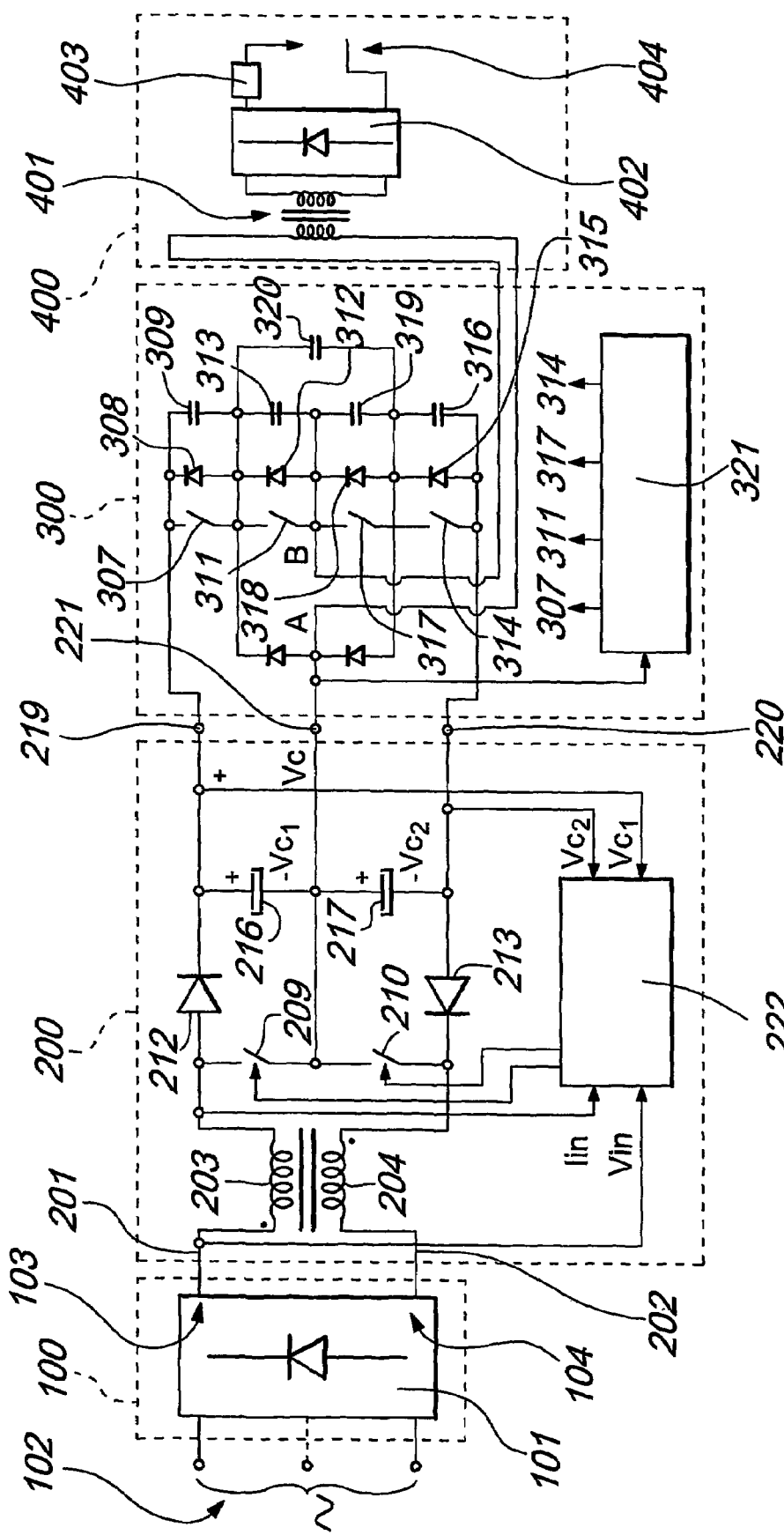
FIG. 5 is a schematic view of the four stage generator of the present invention, illustrating in particular its connections.
Figure 6:
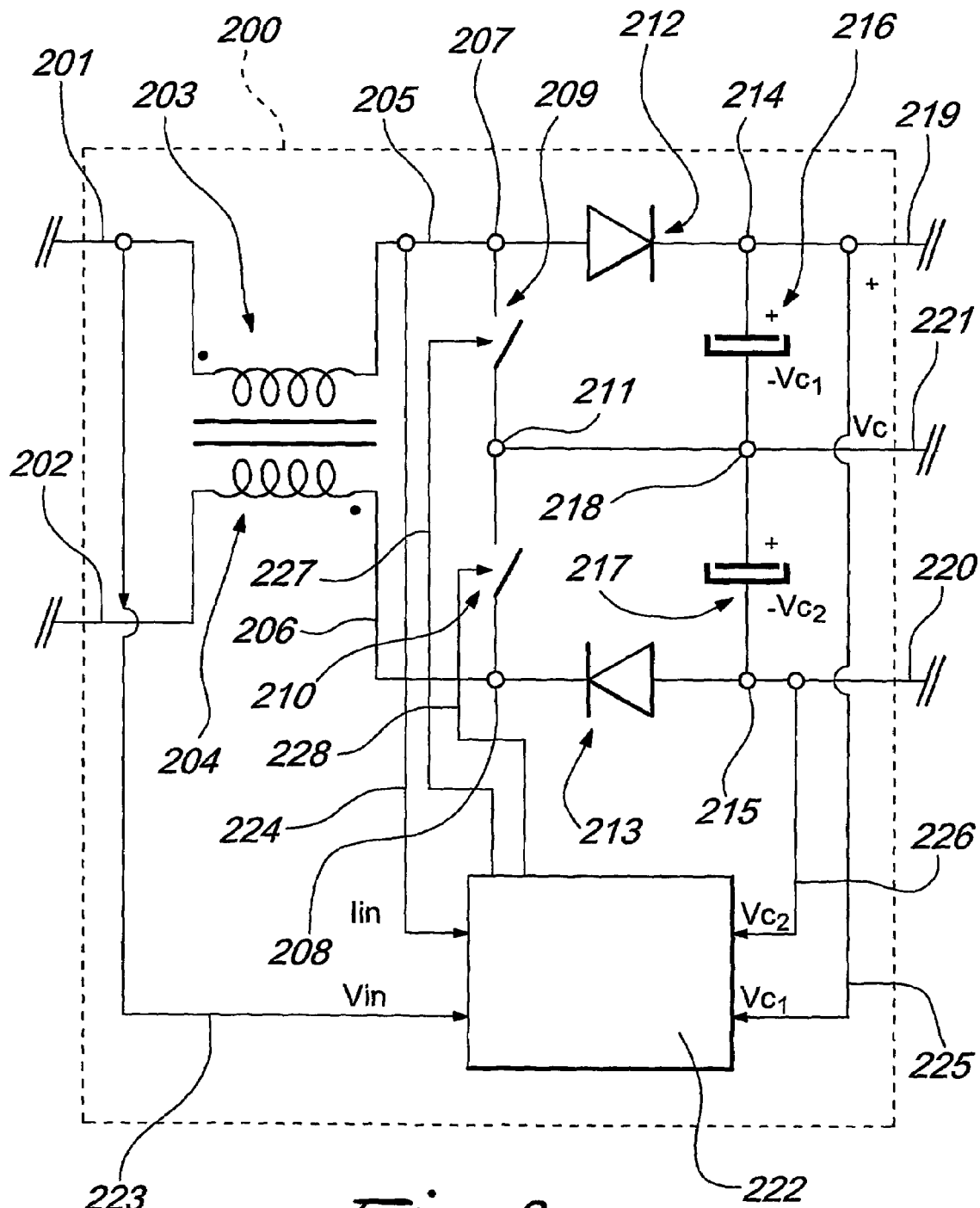
FIG. 6 is a detailed view of the PFC stage.
Figure 7:
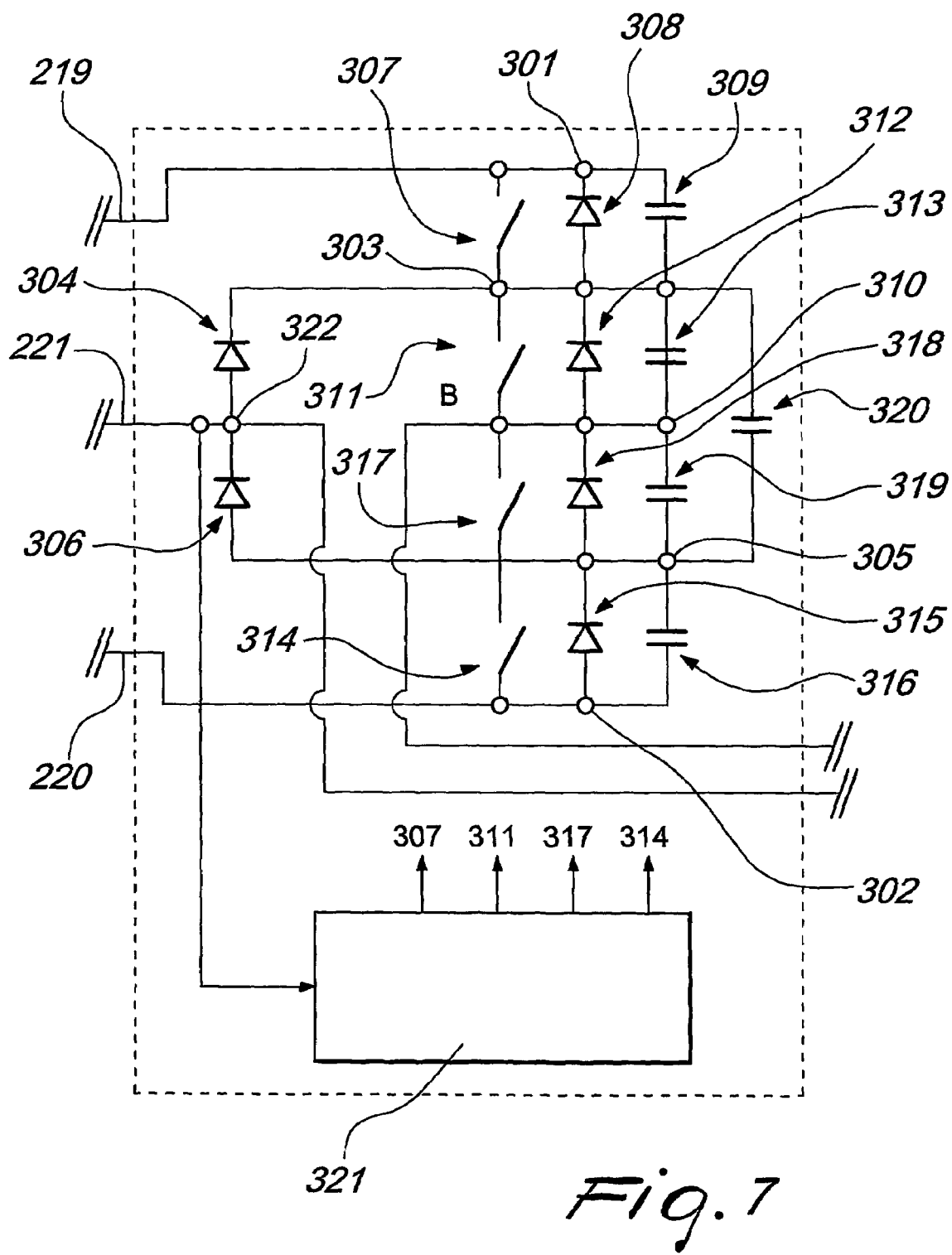
FIG. 7 is a detailed view of the inverter stage.

With reference to the figures, the generator according to the invention can be ideally divided into four stages, which are respectively designated by the reference numeral 100 for the mains power supply stage, by the reference numeral 200 for the PFC stage, by the reference numeral 300 for the inverter stage, and by the reference numeral 400 for the output and arc supply stage.

The mains power supply stage 100 is composed of a conventional rectifier block with diodes 101 that is supplied by a mains 102 and can be single-phase or three-phase.

Two output conductors, designated respectively by the reference numerals 103 and 104, lead out from the stage 101 and continue in the PFC stage 200 in two input conductors 201 and 202.

Two inductors 203 and 204 are respectively connected to the inputs 201 and 202 and are mutually magnetically coupled.

The outputs of the two inductors 203 and 204, designated by the reference numerals 205 and 206, are connected respectively to a first node 207 and to a second node 208.

The first terminal of a first controlled switch 209 is connected to the node, 207, and the first terminal of a second controlled switch 210 is connected to the node 208.

The second terminal of the first controlled switch 209 and the second terminal of the second controlled switch 210 are connected to a common node 211.

The first terminal of a first diode 212 is connected to the node 207, and the first terminal of a second diode 213 is connected to the node 208; the two diodes have opposite conduction directions.

The second terminal of the first diode 212 is connected to a node 214, and the second terminal of the second diode 213 is connected to a node 215.

The first terminal of a first leveling capacitor 216 is connected to the node 214, and the first terminal of a second leveling capacitor 217 is connected to the node 215.

The two capacitors 216 and 217 are arranged so as to have mutually opposite polarities, and their second terminals are connected to a node 218 that is connected to the node 211.

The PFC stage 200 has three output conductors, respectively a conductor 219 connected to the node 214, a conductor 220 connected to the node 215, and a conductor 221 connected to the node 218.

The PFC stage 200 has a control device 222 that controls the on and off switching of the switches 209 and 210, which are of the high-frequency controlled type (IGBT or MOSFET).

The device 222 draws a voltage signal Vin from the input 201 by means of the connection 223, a current signal Iin from the conductor 205 by means of the connection 224, a voltage signal $Vc_1$ from the node 214 or from the capacitor 216 by means of the connection 225, and a voltage signal $Vc_2$ from the node 215 or from the capacitor 217 by means of the connection 226.

In the figure, the connections 227 and 228 designate the control of the switches 209 and 210.

By means of a suitable control of the succession of on and off switchings of the two switches 209 and 210, the control device 222 controls the current absorbed by the rectified power supply stage 100, shaping it so as to follow the waveform of the voltage line, obtained from the signal Vin, so as to have a very low distortion and therefore a very high power factor.

By closing the switches 209 and 210, the current in the inductors 203 and 204 increases with a slope that is equal to $$Vin/(L_1+L_2+M_{12})$$

where $M_{12}$ is a coefficient that takes into account the coupling of the two inductors while the diodes 212 and 213 are off and $L_1$, $L_2$ respectively correspond to inductors 203 and 204.

By opening the switches 209 and 210, the current circulates in 203, 212, 216, 217, 213 and 204 so as to charge the leveling capacitors 216 and 217 and decreases with a slope equal to $$-[Vin-(Vc_1+Vc_2)]/(L_1+L_2+M_{12})$$

By way of the connection between the node 211 and the node 218, or between the two switches 209 and 210 with the two capacitors 216 and 217 that have equal capacitances, the voltage applied to each one of the switches is equal to Vc/2, which is half the voltage that occurs with configurations of normal known PFC stages.

This allows the use of switches that have a lower breakdown voltage and for reasons linked to the manufacturing technology of electronic switches allows to work at higher switching frequencies, consequently allowing to reduce the values of the inductors 203 and 204 and to improve control of the current absorbed from the mains.

As it is known, as the breakdown voltage of electronic switches rises the proper switching times of said switches also increase, and therefore it becomes increasingly necessary to lower the switching frequencies in order to limit the power dissipated by said switches.

The inverter stage 300 has a high switching frequency and comprises: a first external node 301, which is connected to the output conductor 219 of the PFC stage; a second external node 302, which is connected to the output conductor 220; a first intermediate node 303, which is connected to the output conductor 221 with the interposition of a diode 304; and a second intermediate node 305, which is connected to the output conductor 221 with the interposition of a diode 306.

The diodes 304 and 306 are arranged so as to have opposite conduction directions.

A first triad of components in a parallel configuration, constituted by a controlled switch 307, a diode 308 and a capacitor 309, is provided between the first external node 301 and the first intermediate node 303.

A second triad of components in a parallel configuration, constituted by a controlled switch 311, a diode 312 and a capacitor 313, is provided between the first intermediate node 303 and a central node 310.

Likewise, a triad of components in a parallel configuration, constituted by a third controlled switch 314, a diode 315 and a capacitor 316, is provided between the second external node 302 and the second intermediate node 305.

A triad of components in a parallel configuration, composed of a fourth controlled switch 317, a diode 318 and a capacitor 319, is provided between the second intermediate node 305 and the central node 310.

There is also a capacitor 320 that is connected between the two intermediate nodes 303 and 305.

The inverter stage 300 further has a control device 321 for switching on and off the four controlled switches 307, 311, 317 and 314.

By way of the connection between the node 322, which is common to the diodes 304 and 306, and the node 218, the maximum voltage affecting each controlled switch is halved.

This situation allows to use components that have much higher switching frequencies and speeds than circuits with a known layout, so that it is possible to reduce the dimensions of the magnetic components.

In view of the connection between the PFC stage 200 and the inverter stage 300, by means of the conductors 219, 221 and 220, by way of a suitable on and off switching control of the switches it is possible to control the balancing of the voltages on the capacitors 216 and 217 so as to avoid compromising control of the welding current.

The stage 400 is supplied by the node 322 and by the node 310, with which the primary winding of a transformer 401 is associated, said transformer in turn supplying power to a rectifier 402, in which the output supplies the welding arc 404 with the interposition of an inductor 403.

The disclosures in Italian Patent Application No. PD2003A000027 from which this application claims priority are incorporated herein by reference.

What is claimed is:

1. A generator for arc welder of the type composed of a rectifier stage supplied by the mains, followed by a PFC stage and by an inverter stage, both of the high-frequency type, the latter supplying an output stage for supplying power to a welding arc, wherein:

said PFC stage is composed of:

two inductors, which are mutually magnetically coupled and are arranged each one in series with an output of the rectifier stage;

two first high-frequency controlled switches, which are connected between a common node and two nodes respectively at the outputs of the two inductors;

two diodes with opposite conduction directions, which are respectively connected to the nodes between the switches and mutual inductors;

two leveling capacitors, which are connected to the output nodes of said diodes and the common node of said first switches;

means being further provided for controlling the succession of the on and off switchings of said two first switches, so as to shape the current absorbed by the rectifier stage, correlating it to the waveform of the line voltage;

said inverter stage, supplied between the common node of said first high-frequency switches and the common node between said capacitors, comprises four triads, each composed of a second controlled switch, a diode and a capacitor, connected so as to form five nodes, respectively a central node, two intermediate nodes and two external nodes, said external nodes being connected to the nodes between said first switches and the respective diodes, said intermediate nodes being connected to the common node of said two first electronic switches with the interposition of a diode respectively, a capacitor being connected between said intermediate nodes, a control device being further provided for the four second switches, the current for the output stage that supplies the welding arc being drawn between the common of the two first switches and the central node of said four triads of second controlled switches, diodes and capacitors.

2. The generator of claim 1, wherein the mains power supply is single-phase.

3. The generator of claim 1, wherein said first two switches are of the type known as IGBT.

4. The generator of claim 1, wherein said two first switches are of the type known as MOSFET.

5. The generator of claim 1, wherein said means that control the on and off switching of said first switches are constituted by a device that draws voltage and current signals and controls the current absorbed by the rectified power supply stage, by shaping its waveform obtained from the signal Vin, so as to reduce distortion and obtain a very high power factor.

6. The generator of claim 1, wherein said two diodes of the inverter stage, the common node of which is connected to the node of the PFC stage, descrease by 50% the maximum voltage on the four controlled switches, allowing the use of components that have a high switching frequency and speed.

7. The generator of claim 1, wherein the mains power supply is three-phase.

* * * * *